US009575734B2

(12) United States Patent
Ramkumar et al.

(10) Patent No.: US 9,575,734 B2
(45) Date of Patent: Feb. 21, 2017

(54) SYSTEM AND METHOD FOR IMPROVED LIGHT-WEIGHT BUSINESS PROCESS MODELING IN OFFLINE MODE USING BROWSER RESOURCES

(71) Applicants: Nithya Ramkumar, Bangalore (IN); Hemant Kumar, Delhi (IN); Mohammed Arif, Bihar (IN); Nilesh Ramesh Metkar, Bangalore (IN); Soham Bhaumik, Bangalore (IN); Amit Krishna, Bangalore (IN)

(72) Inventors: Nithya Ramkumar, Bangalore (IN); Hemant Kumar, Delhi (IN); Mohammed Arif, Bihar (IN); Nilesh Ramesh Metkar, Bangalore (IN); Soham Bhaumik, Bangalore (IN); Amit Krishna, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 243 days.

(21) Appl. No.: 14/290,053

(22) Filed: May 29, 2014

(65) Prior Publication Data
US 2015/0277716 A1    Oct. 1, 2015

(30) Foreign Application Priority Data
Mar. 28, 2014    (IN) ............................ 1675/CHE/2014

(51) Int. Cl.
*G06F 3/048*    (2013.01)
*G06F 9/44*    (2006.01)
*G06Q 10/06*    (2012.01)

(52) U.S. Cl.
CPC . *G06F 8/35* (2013.01); *G06F 8/34* (2013.01); *G06Q 10/067* (2013.01)

(58) Field of Classification Search
CPC ................................. G06F 9/4443; G06F 3/00
USPC ......................................................... 715/763
See application file for complete search history.

(56) References Cited

U.S. PATENT DOCUMENTS

| 7,506,072 | B2 | 3/2009 | Waldorf et al. | |
|---|---|---|---|---|
| 7,519,976 | B2* | 4/2009 | Blevins ................. | G06Q 10/06 707/999.1 |
| 8,185,916 | B2* | 5/2012 | Toussaint ............... | G06Q 10/06 719/328 |
| 8,275,791 | B2* | 9/2012 | Raffaele ................. | G06F 9/468 707/782 |

(Continued)

*Primary Examiner* — David Phantana Angkool
(74) *Attorney, Agent, or Firm* — Finnegan, Henderson, Farabow, Garrett & Dunner, LLP (57) ABSTRACT

The present disclosure relates to methods of systems for process modeling. Embodiments of the present disclosure may store a user interface framework in a memory allocated to a browser application in the computer. The user interface framework may provide a user interface to a user operating the computer to perform process modeling. Some embodiments may also render the user interface using a rendering engine associated with the browser application and capture one or more process modeling events received as input by the user. The one or more process modeling events may be associated with one or more process models. In addition, some embodiments may store the one or more process modeling events as model data in the memory allocated to the browser application and render the one or more process models on the user interface based on at least a subset of the model data.

15 Claims, 8 Drawing Sheets (56) References Cited

U.S. PATENT DOCUMENTS

| | | | |
|---|---|---|---|
| 8,356,075 B2 | 1/2013 | Balko | |
| 8,762,187 B2 * | 6/2014 | Gu | G06Q 10/06 |
| | | | 705/7.11 |
| 9,092,280 B2 * | 7/2015 | Hu | G06F 9/544 |
| 9,317,701 B2 * | 4/2016 | Waterson | G06F 21/60 |
| 2008/0155495 A1 | 6/2008 | Van Wyk et al. | |
| 2010/0293481 A1 | 11/2010 | Austin | |
| 2012/0110157 A1 * | 5/2012 | Portier | G06F 17/30893 |
| | | | 709/223 |
| 2012/0275597 A1 * | 11/2012 | Knox | H04L 9/0833 |
| | | | 380/210 |
| 2012/0306898 A1 | 12/2012 | Scheidhauer et al. | |
| 2013/0232506 A1 * | 9/2013 | Mazzoni | G06F 9/542 |
| | | | 719/313 |
| 2013/0254520 A1 * | 9/2013 | Birnkrant | G06F 8/63 |
| | | | 713/2 |

* cited by examiner

SYSTEM AND METHOD FOR IMPROVED LIGHT-WEIGHT BUSINESS PROCESS MODELING IN OFFLINE MODE USING BROWSER RESOURCES

CROSS REFERENCE TO RELATED APPLICATION

The present application claims the benefit of priority to Indian Patent Application No. 1675/CHE/2014, filed Mar. 28, 2014, the contents of which are expressly incorporated herein in their entirety.

TECHNICAL FIELD

This disclosure relates generally to business process modeling. More specifically, it relates to a browser based business process modeling tool capable of performing business process modeling in an offline mode.

BACKGROUND

Business process management (BPM) is known as a complete management approach that positions a business' processes to fulfill a client's needs. BPM focuses on process automation and optimization using systematic methods to continuously improve the effectiveness and efficiency of business processes while focusing on innovation, adaptability, and technology integration. In a sense, BPM can give businesses the agility to adapt to more dynamic conditions in markets and the wherewithal to withstand significant management stressors.

Currently, most BPM modeling tools have to be installed on the user's computer, which brings the routine problems of installations, maintenance, etc. Because business process modeling often requires collaboration among multiple parties that may be located at different places and/or use different computer systems or computer system with different configurations, the system resources required for a business process modeler to function properly is quite high.

While browser based BPM solutions are available, they often require Internet connection while modeling business processes. When Internet connectivity is not available or not stable, the usefulness of such solutions is limited. In other words, current browser based business process modelers cannot work properly in offline mode when there are Internet connectivity issues.

Thus, it is desirable to develop a new business processes modeling solution that is capable of working properly even in offline mode.

SUMMARY

Certain embodiments of the present disclosure relate to a method, implemented by a computer, for process modeling. The method may comprise storing a user interface framework in a memory allocated to a browser application in the computer. The user interface framework may provide a user interface to enable the computer to receive input from a user to perform process modeling. The method may also comprise rendering the user interface using a rendering engine associated with the browser application and capturing, by the computer, one or more process modeling events received as input from the user. The one or more process modeling events may be associated with one or more process models. In addition, the method may comprise storing the one or more process modeling events as model data in the memory allocated to the browser application and rendering the one or more process models on the user interface based on at least a subset of the model data.

In certain embodiments, the user interface framework may comprise at least one of HTML5, CSS3, JavaScript, and Scalable Vector Graphics (SVG) components.

In certain embodiments, the one or more process modeling events may comprise at least one of: mouse events, user interface events, keyboard events, form events, document events, or window events.

In certain embodiments, the model data may comprise visual data and process data. The method may further comprise rendering a graphical representation of the one or more process models based on the visual data. Alternatively or additionally, the method may further comprise displaying one or more properties of the one or more process models based on the process data.

In certain embodiments, storing at least one of the user interface framework or the model data may be independent of configuration of the client device.

Certain embodiments of the present disclosure also relate to a computer system for process modeling. The computer system may comprise a processor operatively coupled to a memory device. The processor may be configured to execute instructions stored in the memory device to perform operations. The operations may comprise storing a user interface framework in a memory allocated to a browser application. The user interface framework may provide a user interface to enable the computer system to receive input from a user to perform process modeling. The operations may also comprise rendering the user interface using a rendering engine associated with the browser application and capturing one or more process modeling events received as input from the user. The one or more process modeling events may be associated with one or more process models. In addition, the operations may comprise storing the one or more process modeling events as model data in the memory allocated to the browser application and rendering the one or more process models on the user interface based on at least a subset of the model data.

Certain embodiments of the present disclosure also relate to a non-transitory, computer-readable medium storing instructions that, when executed by a processor, cause the processor to perform operations comprising storing a user interface framework in a memory allocated to a browser application in a client device. The user interface framework may provide a user interface to enable the processor to receive input from a user to perform process modeling. The operations may also comprise rendering the user interface using a rendering engine associated with the browser application and capturing one or more process modeling events received as input from the user. The one or more process modeling events may be associated with one or more process models of the process. In addition, the operations may comprise storing the one or more process modeling events as model data in the memory allocated to the browser application and rendering the one or more process models on the user interface based on at least a subset of the model data.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Figure 1:
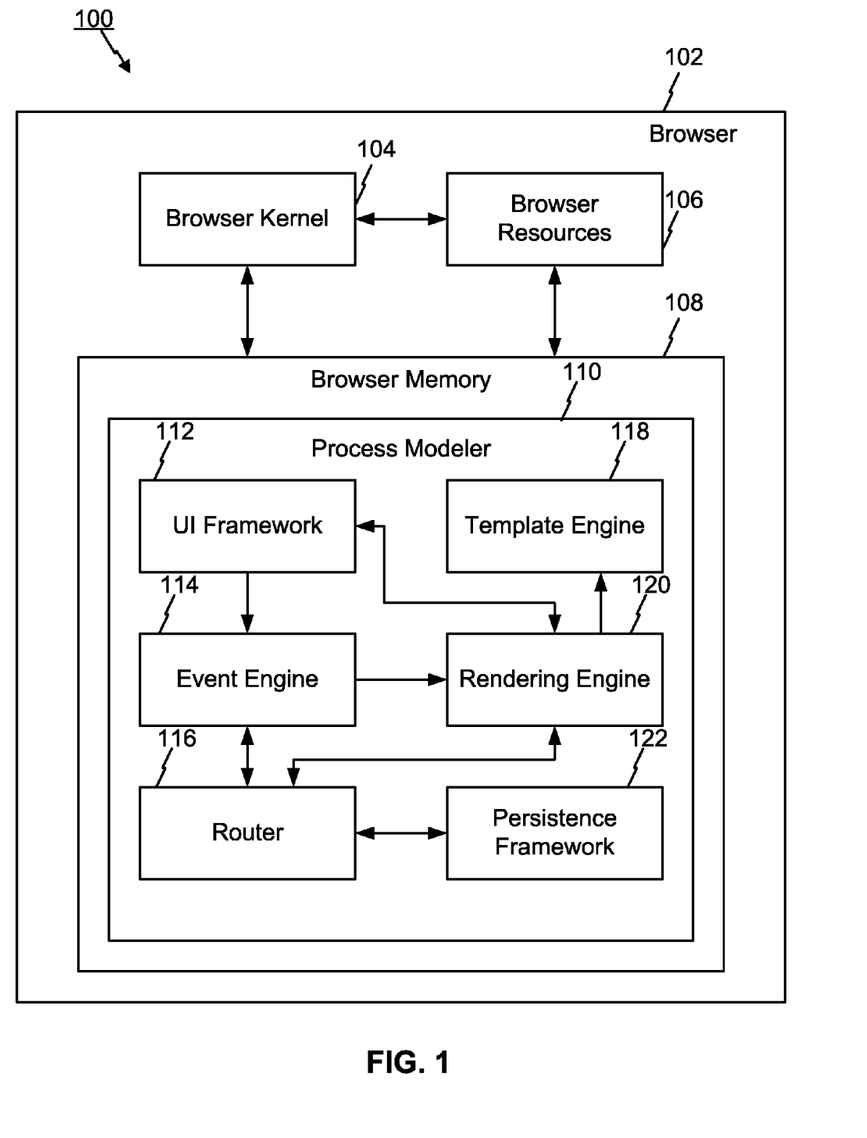
FIG. 1 illustrates an exemplary browser based business process modeling system, according to some embodiments of the present disclosure.

FIG. 1 illustrates an exemplary browser based business process modeling system 100, which may include a browser application 102. Browser application 102 refers to a software application for accessing information on the web (e.g., Internet). Browser application 102 may include software applications such as Internet Explorer, Chrome, Firefox, Safari, etc. While browser application 102 may normally be used in an online mode in which network connection is available for accessing information on the web, browser application 102, as a stand-alone computer application, can also run on a computer in an offline mode in which network connection is not available or not stable. When browser application 102 is executed in the offline mode, a number of software modules may be invoked and certain resources may be available. A browser based software application may utilize such software modules and/or resources to perform certain desirable functions.

Browser application 102 may include browser kernel 104. Browser kernel 104 may include a software framework to support a set of essential functions of browser application 102. The set of essential functions may be similar across various other implementations of browser application 102. For example, browser kernels of Internet Explorer, Chrome, etc. may include a similar set of essential functions. The similarity of browser kernel 104 across a wide range of systems makes it possible to develop a browser based application that is universally executable on different systems, as long as some kind of browser application is installed on each system.

Browser application 102 may also include browser resources 106. Browser resources 106 may include a wide range of resources that are available to browser application 102. For example, browser resources 106 may include image resource, directory resource, file resource, etc. Browser kernel 104 may interact with browser resources 106 in the execution of browser application 102.

Browser application 102 may also include browser memory 108. Browser memory 108 refers to a memory specifically allocated to browser application 102. In certain embodiments, browser memory 108 is protected from access by other software applications, and may only be available to browser application 102. In other words, once allocated to browser application 102, browser memory 108 may be isolated from the rest of main memory of the computer on which browser application 102 is installed. Within the mini computational environment provided by browser application 102, browser memory may act as the main memory of this mini computational environment.

Browser memory 108 may store a process modeler 110 for process modeling. Process modeler 110 may include a complete software framework to perform process modeling. In certain embodiments, process modeler 110 may include a web-based editor that is able to run in browser application 102. Process modeler 110 may be capable of designing business processes. In certain embodiments, process modeler 110 may be extensible by means of plugin infrastructure to easily extend functionality. Process modeler 110 may use SVG for its graphical representation of processes.

Process modeler 110 may include a user interface (UI) framework 112. UI framework 112 may provide a highly interactive user interface to enable a user to perform process modeling using process modeler 110. The user interface may provide simple, consistent and reliable programing/designing interface for the user. In certain embodiments, UI framework 112 may include complex UI widgets or components using browser supported technologies. For example, UI Framework 112 may include HTML5, CSS3, SVG, and/or JavaScript etc. Such technologies may improve the ease of customization, localization, and utilization of templates. In certain embodiments, extension of functionality may be implemented via plugin mechanism.

UI framework 112 may interact with event engine 114 for forwarding user's actions or process modeling events input by a user while the user is using browser application 102. UI framework 112 may also interact with rendering engine 120 for displaying or loading user's requested information or data.

Process modeler 110 may include an event engine 114. Event engine 114 may handle multiple types of process modeling events that happen in process modeler 118. As used herein, process modeling events may include all the user's actions to which the process modeler 110 can respond. Process modeling events may include mouse events (e.g., button clicking, wheel turning, mouse moving, etc.), UI events (e.g., focus in/out, zoom in/out, etc.), keyboard events (e.g., key stroking, key holding, etc.), form events, document events, window events, etc. Event engine 114 may capture one or more process modeling events and respond to the captured process modeling events in an asynchronous manner. For example, event engine 114 may handle process modeling events by accepting or accumulating incoming requests for handling process modeling events without waiting for completion of previous requests. Once a request is processed, the results or actions of the processing can be passed back to the requesting subsystem using a callback mechanism. This asynchronous processing scheme may improve system capability and/or responsibility when massive parallel concurrent requests occur.

In certain embodiments, event engine 114 may include common event framework using browser supported technologies such as JavaScript, Object Oriented JavaScript, JQuery, etc.

Process modeler 110 may include a rendering engine 120. As used herein, the term rendering refers to presenting one or more process models and/or user interface elements on the user interface of process modeler (e.g., provided by UI framework 112) in visual format. In certain embodiments, rendering engine 120 may interact with UI framework 112. For example, rendering engine 120 may be used to render the user interface provided by UI framework 112. Rendering engine 120 may also interact with event engine 114. For example, one or more process modeling events associated with one or more process models may be captured by event engine 114 and may be stored as model data in browser memory 108. Rendering engine 120 may render the one or more process models on the user interface provided by UI framework 112 based on at least a subset of the model data. In certain embodiments, model data stored in browser memory 108 may include visual data and process data. Rendering engine 120 may render a graphical representation of one or more process models based on the visual data. Rendering engine 120 may also display one or more properties of the one or more process models based on the process data. In certain embodiments, model data stored in browser memory 108 may be retrieved from a persistence framework 122 through a router 116. The retrieved model data may then be used to render process models, or to load certain process models requested by the user onto the user interface. Rendering engine may also interact with a template engine 118 to display complex process models, such as business data and/or properties of business process objects.

Process modeler 110 may include a template engine 118. Template engine 118 may include templates that provide a consistent approach for building dynamically reusable HTML and UI elements. As used herein, the term templates refer to components composed to form rich user interface. In certain embodiments, templates may have built-in message support to provide easy localization of applications built based on templates. Templates may allow to design or define fragments of markup that are parsed as HTML, which are not executed when loading a page onto browser application 102, but can be instantiated during runtime. In certain embodiments, templates may be built using JavaScript. Template engine 118 may interact with rendering engine 120 to provide process model templates for displaying onto the user interface.

Process modeler 110 may include a router 116. Router 116 may act as a bridge (e.g., middleware) between presentation and persistence layers. For example, router 116 may transfer data requests between persistence framework 122 and other process modeler components, such as event engine 114 and rendering engine 120. Router 116 may detect whether process modeler 110 is running in online or offline mode by pinging a remote server. If a response is not received within a predetermined time period from the remote server after pinging, router 116 may determine that process modeler 110 is running in an offline mode. In the offline mode, router 116 may use persistence framework 122 to access data stored in browser memory 108. On the other hand, if a response is received from the remote server, router 116 may determine that process modeler 110 is in an online mode. In the online mode, router 116 may fetch data from one or more remote servers.

Process modeler 110 may include a persistence framework 122. Persistence framework 122 may be middleware that assists in retrieving/storing of data, such as process modeling events or model data, into browser memory 108. Persistence framework 122 may act as a layer of abstraction between the process modeler 110 and browser memory 108. In certain embodiments, persistence framework 122 may be an asynchronous framework. As discussed before, in an asynchronous framework, requests for operations may accumulate without waiting for completion of previous operations. Once an operation is complete, a callback function can be invoked to return the results/actions of the operation to the requester. Persistence framework 122 may simplify data interaction in offline mode or in situation when multiple browsers are involved. In certain embodiments, persistence framework 122 may be built using Object Oriented JavaScript or other suitable technologies.

Figure 2:
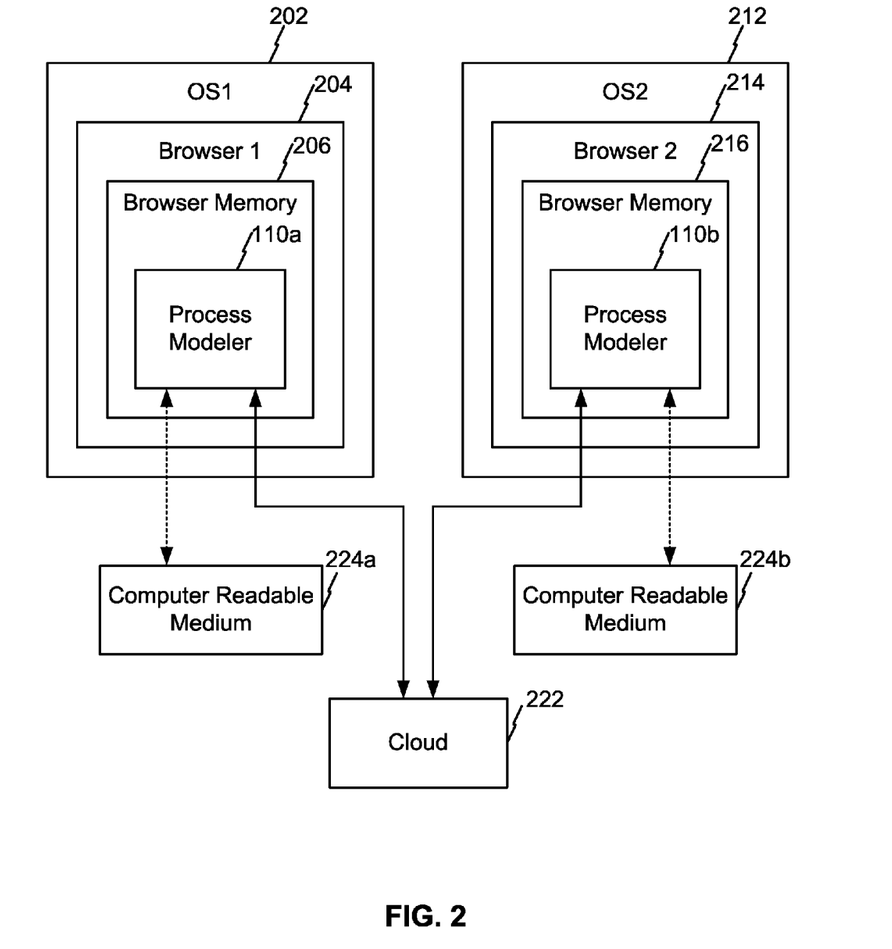
FIG. 2 illustrates exemplary modes of communication between a browser based process modeling system and an external system, according to some embodiments of the present disclosure.

FIG. 2 illustrates exemplary modes of communication between a browser based process modeling system and an external system, according to some embodiments of the present disclosure. In FIG. 2, process modelers 110a and 110b may be similar to, and in certain embodiments may be identical to, process modeler 110 shown in FIG. 1. For example, process modeler 110b may contain coding that is substantial the same as that of process modeler 110b. As shown in FIG. 2, process modelers 110a and 110b may be stored in browser memories of different computers having different operational systems and/or different browsers. For example, process modeler 110a may be stored in a first browser memory 206 allocated to a first browser 204 that is installed on a first computer having a first operational system 202. Process modeler 110b may be stored in a second browser memory 216 allocated to a second browser 214 that is installed on a second computer having a second operational system 212 and may perform substantially the same way as process modeler 110a stored in the first browser memory 206. In other words, process modeler 110a/110b may be machine independent, operational system independent, and/or browser application independent.

FIG. 2 shows two approaches to storing data, such as UI framework 112 and/or model data, into browser memory. The first approach includes when process modeler 110a/110b is in an online mode. The data transfer paths in the online mode are shown in solid lines with double arrows. In the online mode, process modeler 110a/110b may retrieve/store data, such as UI framework 112, model data, templates, etc., from a cloud 222. Cloud 222 may include one or more servers located remotely with respect to the computer on which process modeler 110*a* or 110*b* is running. As discussed before, the retrieval/storage of data in the online mode may be implemented using router 116. The second approach is when process modeler 110*a*/110*b* is in an offline mode. The data transfer paths in the offline mode are shown in dashed lines with double arrows. In the offline mode, process modeler 110*a*/110*b* may retrieve data, such as UI framework 112, model data, templates, etc., from a computer readable medium. For example, process modeler 110*a* stored in browser memory 206 may retrieve data from computer readable medium 224*a*. Similarly, process modeler 110*b* stored in browser memory 216 may retrieve data from computer readable medium 224*b*. Computer readable medium 224*a* may be located locally with respect to the computer on which process modeler 110*a* is running. Similarly, computer readable medium 224*b* may be located locally with respect to the computer on which process modeler 110*b* is running. Computer readable medium 224*a*/224*b* may include USB drives, portable hard drives, CD/DVD, or other storage media that are capable of locally communicating with process modeler 110*a*/110*b*, such as through USB connection and optical disk drive. As discussed above, the retrieval/storage of data in the offline mode may be implemented using router 116 and persistence framework 122. In either online or offline mode, the retrieval/storage of data may be independent of the configuration of the computer on which process modeler is running.

Figure 3:
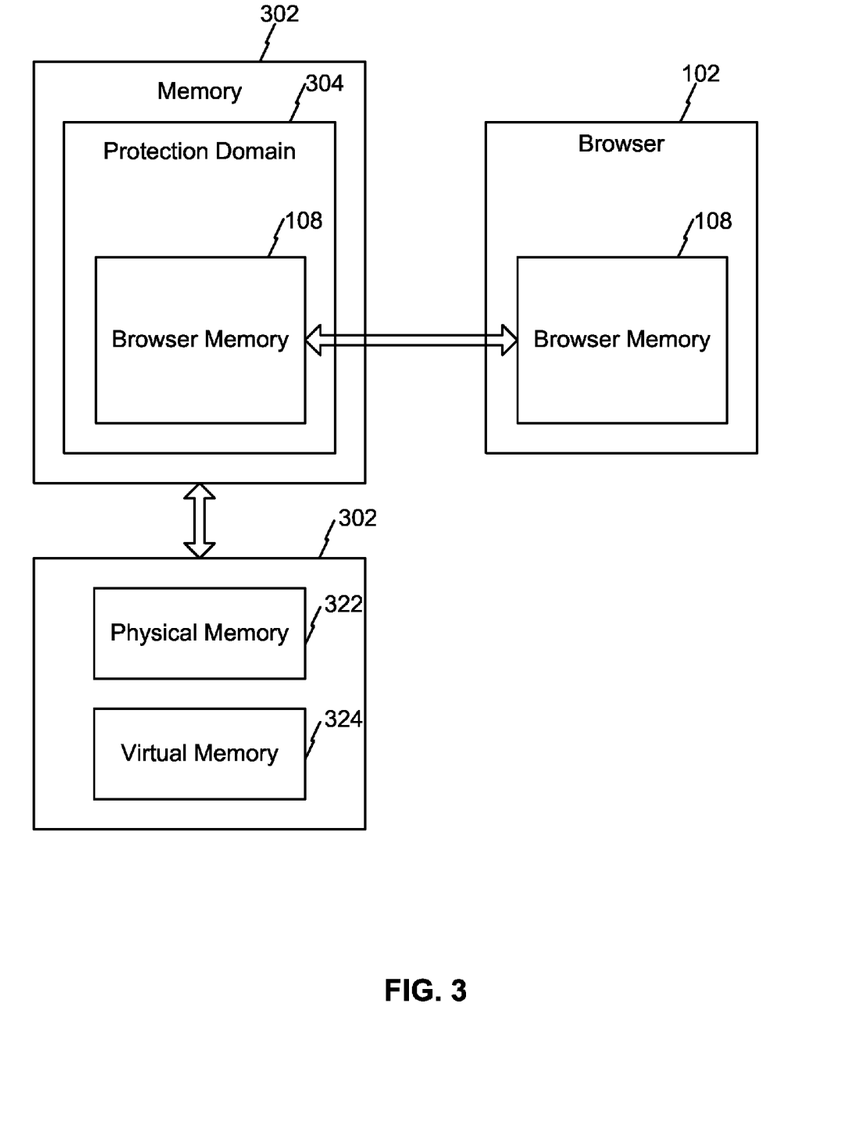
FIG. 3 illustrates an exemplary memory allocation scheme, according to some embodiments of the present disclosure.

FIG. 3 illustrates an exemplary memory allocation scheme, according to some embodiments of the present disclosure. As shown in FIG. 3, browser memory 108 may correspond to a memory block in the main memory 302 of the computer on which browser application 102 is running. When browser application 102 is initiated in the computer, a block of memory may be allocated to browser application 102 for it to store and access any data. In certain embodiments, the allocated memory block may be protected in a protection domain 304, in which other applications cannot access or store data. When process modeler 110 is opened in browser application 102, a sub-block of memory (not shown) in browser memory 108 may be allocated to process modeler 110. In certain embodiments, the entire data of process modeler 110 may be stored in browser memory 108. It is noted that main memory 302 may include physical memory 322, such as RAM/ROM. Main memory 302 may also include virtual memory 324, such as one or more portions of persistent disk (e.g., hard disk, solid-state disk, etc.), which function as memory transparent to browser application 102.

Figure 4:
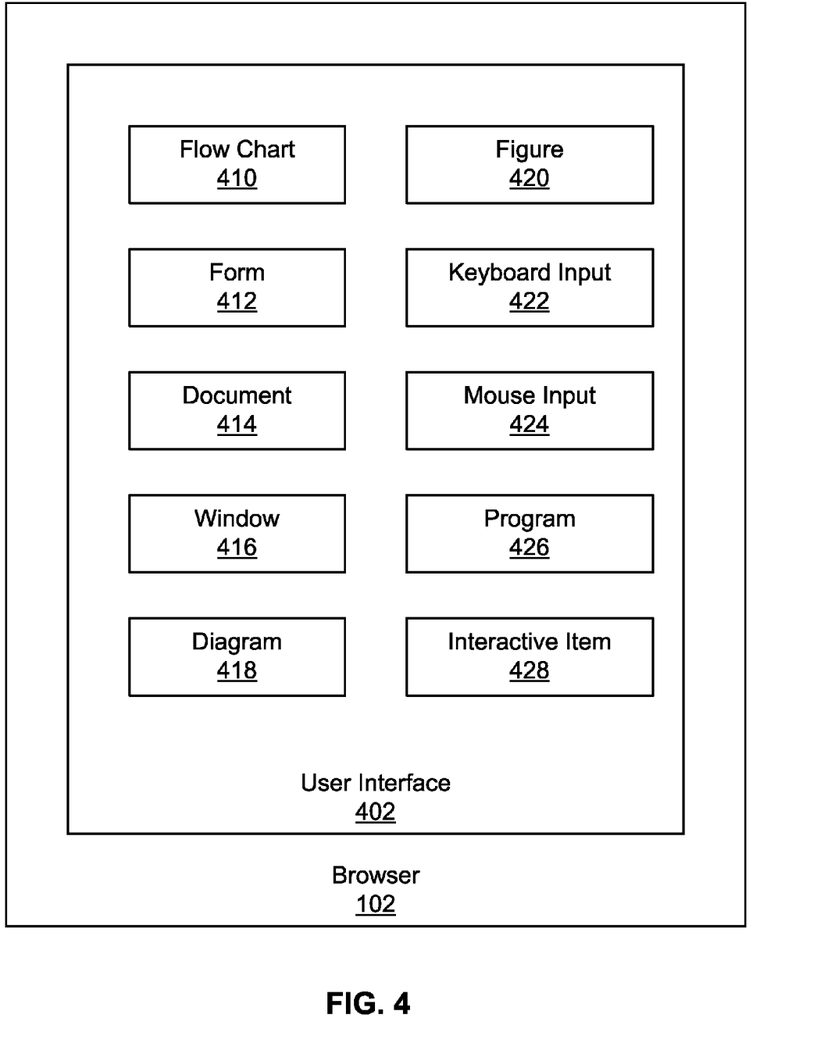
FIG. 4 is a block diagram of an exemplary user interface of a browser based process modeling system, according to some embodiments of the present disclosure.

FIG. 4 is a block diagram of an exemplary user interface of a browser based process modeling system, according to some embodiments of the present disclosure. In FIG. 4, browser application 102 may include a user interface 402. User interface 402 may be provided by UI framework 112 of process modeler 110. User interface 402 may include various UI elements or process entities. For example, user interface 402 may include flow chart 410, form 412, document 414, window 416, diagram 418, FIG. 420, keyboard input 422, mouse input 424, program 426, and interactive item 428. Each of these UI elements or process entities may constitute a process model. For example, flow chart 410 may constitute a flow chart model that depicts sequential steps of a method or process. Similarly, document 414 may constitute a document model that includes text/graphical documents. Program 426 may constitute a program model that includes executable instructions for performing a certain task, such as numerical calculation, file operation (open/edit/ save/close, etc.), database access, etc. Interactive item 428 may include models that are capable of interacting with a user, such as step-by-step guides, pop-up notifications, multimedia instructions, buttons, selection fields, menus, sliding bars, etc. In addition, each of these UI elements or process entities may trigger one or more process modeling events. For example, keyboard input 422 may trigger a keyboard event (i.e., a determination that a user has entered data via a keyboard) that can be captured by event engine 114. Similarly, mouse input 424 may trigger a mouse event (i.e., a determination that a user has selected data via a mouse) that can be captured by event engine 114. Determining that a user is moving or resizing a window 416 may trigger a window event. Determining that a user is opening/editing/ saving/closing a document may trigger a document event. One or more process modeling events may be associated with one or more process models. For example, a form event may be associated with a process model that involves forms (e.g., a template document having one or more fields for receiving input responsive to questions/topic designations presented with the fields in the document). A diagram event may be associated with a process model that involves diagrams (e.g., a drawing/schematic representation showing the appearance, structure, and/or workings of a business process entity). A figure event may be associated with a process model that involves figures (e.g., a graphical representation of a business process entity). One or more process modeling events may be stored in browser memory 108 as model data. The model data may then be used to render process models on user interface 402.

Figure 5:
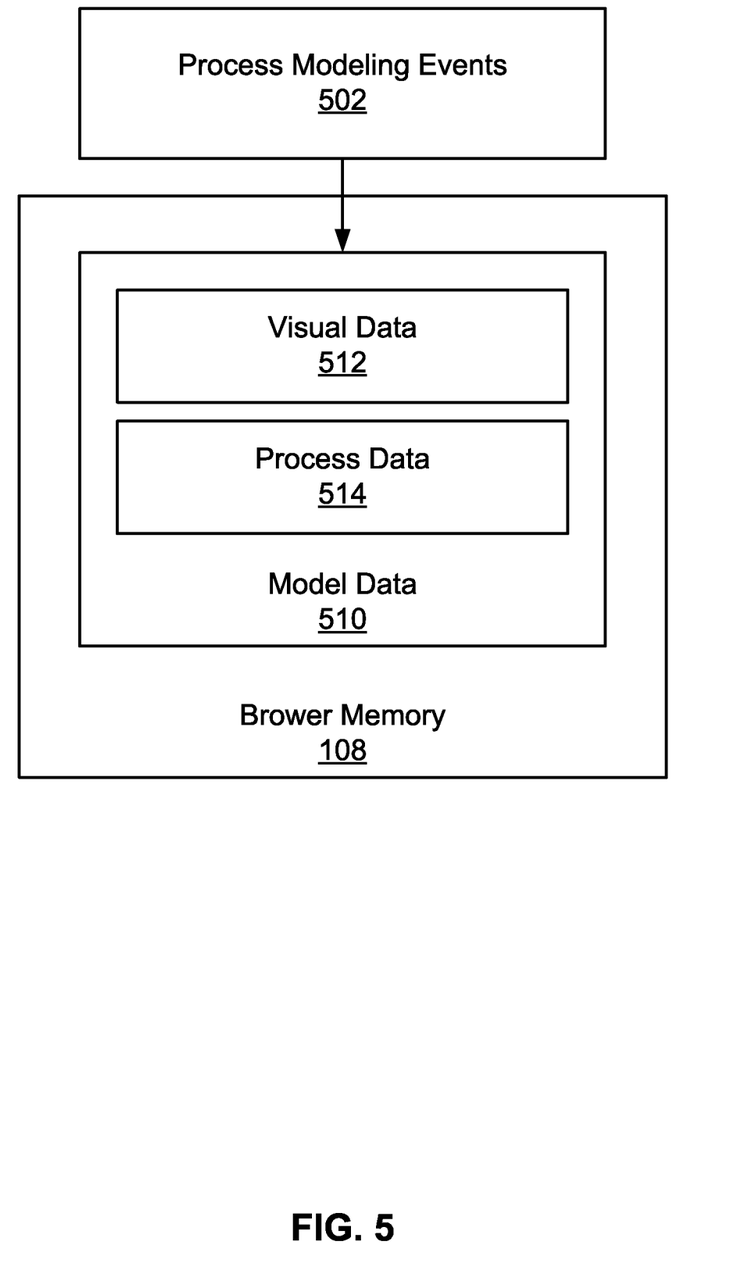
FIG. 5 illustrates exemplary model data, according to some embodiments of the present disclosure.

FIG. 5 illustrates exemplary model data, according to some embodiments of the present disclosure. As shown in FIG. 5, process modeling events 502 may be stored in browser memory 108 as model data 510. Model data 510 may include visual data 512 for rendering graphical representations of process models. For example, visual data 512 may include data relating to visual rendering of a process model, such as the color, shape, position, shading, etc. of the process model. In certain embodiments, visual data 512 may include predefined graphical icons corresponding to a particular type of process model. Model data 510 may also include process data for displaying one or more properties of process models. For example, process data may include data relating to properties of a process model, such as the data source, data computation formulas, relationship with other process models, etc.

Figure 6:
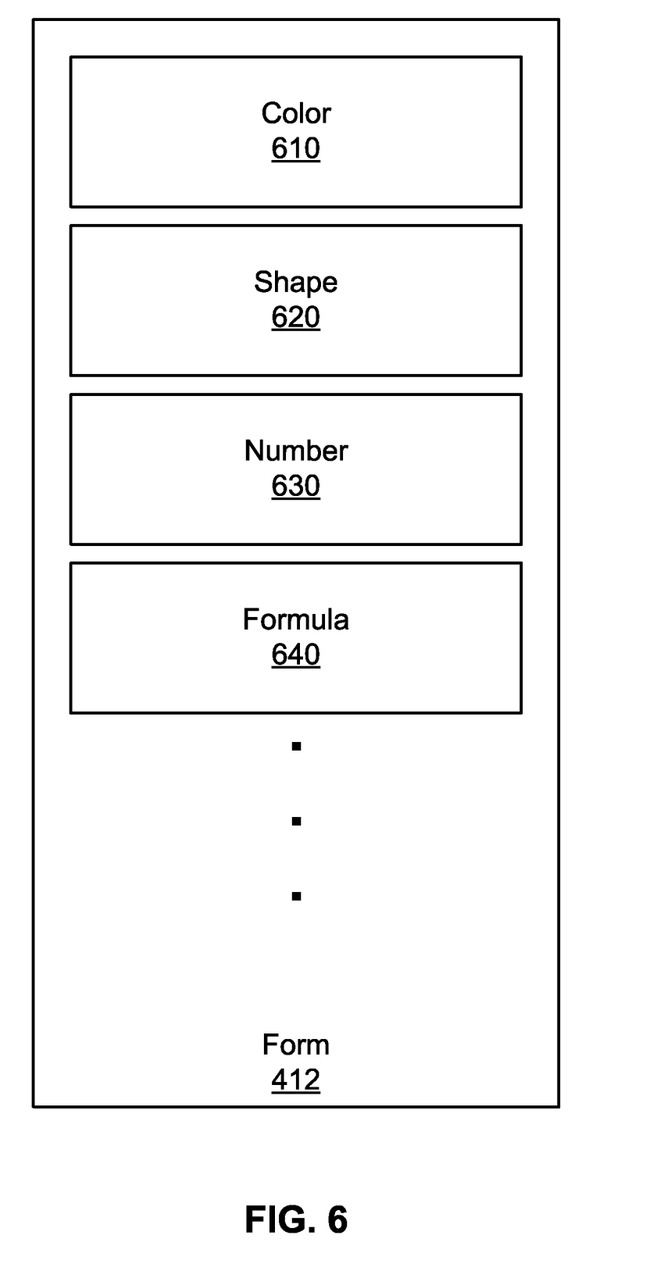
FIG. 6 is a functional block diagram of an exemplary process entity, according to some embodiments of the present disclosure.

FIG. 6 is a functional block diagram of an exemplary process entity, according to some embodiments of the present disclosure. As shown in FIG. 6, form 412 may include various properties or attributes that are used to render/ display form 412, such as color 610, shape 620, number 630, formula 640, etc. Each of these properties/attributes may be used to render the graphical representation of form 412, and/or to display the content of form 412. For example, color 610 and shape 620 may be used to render a graphical representation of form 412 on user interface 402. In another example, number 630 may include data entries of form 412. Similarly, formula 640 may include instructions for numerical and/or logical computations of the data contained in form 412. Number 630 and formula 640 may be used to display the content of form 412 on user interface 402. In certain embodiments, color 610 and shape 620 may be part of visual data 512, while number 630 and formula 640 may be part of process data 514.

Figure 7:
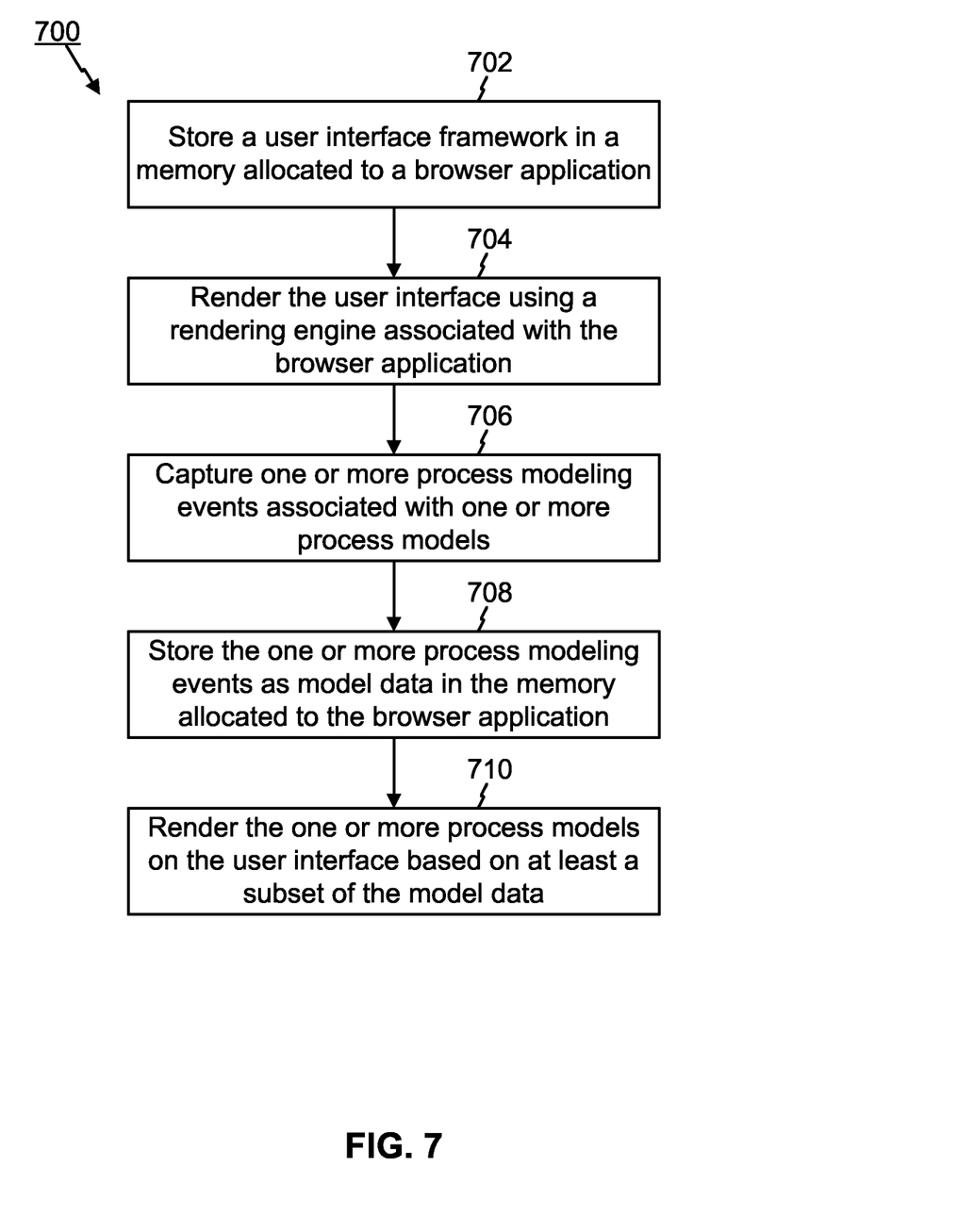
FIG. 7 is a flowchart of an exemplary method for process modeling, consistent with the some embodiments of the present disclosure.

FIG. 7 is a flowchart of an exemplary method 700 for process modeling, consistent with the some embodiments of the present disclosure. At step 702, a user interface framework, such as UI framework 112, may be stored in a memory allocated to a browser application, such as browse memory 108 allocated to browser application 102.

At step 704, a rendering engine associated with the browse application, such as rendering engine 120, may be used to render a user interface (e.g., user interface 402 provided by UI framework 112). For example, the rendering engine 120 may render a user interface depicting a business process associated with manufacturing a product. At step 706, one or more process modeling events (e.g., mouse events, user interface events, keyboard events, form events, document events, window events, etc.) associated with one or more process models may be captured by an event engine, such as event engine 114. For example, event engine 114 may capture a mouse event resulting from a user clicking on a manufacturing step in a flow chart displayed on the user interface. At step 708, the one or more process modeling events may be stored as model data in browser memory 108. For example, the mouse clicking event may be stored as model data in browser memory 108. At step 710, rendering engine 120 may be used to render the one or more process models on the user interface (e.g., user interface 402) based on at least a subset of the model data. For example, rendering engine 120 may render the manufacturing step on which the user clicked using a different color, such as a darker color to highlight the manufacturing step, based on the mouse click event. In another example, render engine 120 may render the manufacturing step on which the user clicker by adding an overlay, such as a pop-up window showing information related to the manufacturing step, based on the mouse click event.

Figure 8:
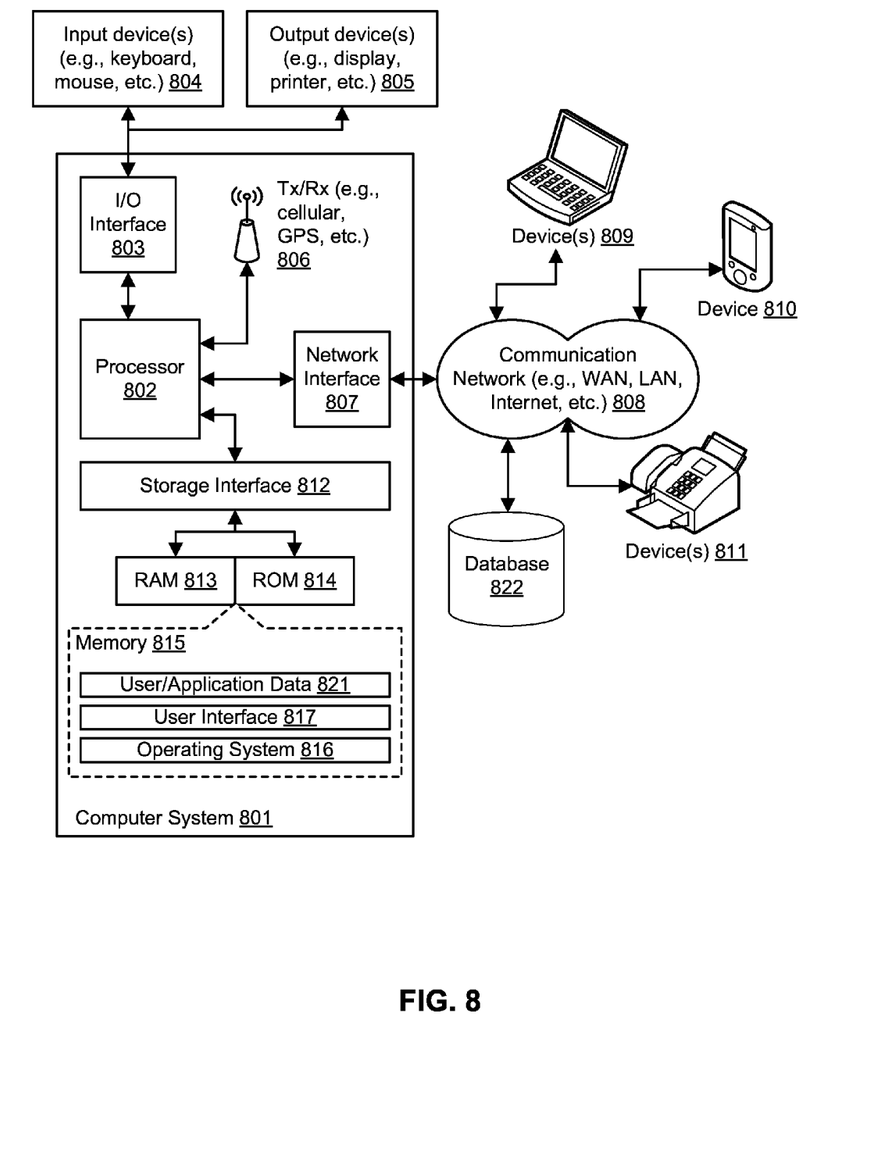
FIG. 8 illustrates an exemplary computer system for implementing methods and systems consistent with the present disclosure.

FIG. 8 illustrates an exemplary computer system 801 for implementing methods and systems consistent with the present disclosure. For example, computer system 801 may be used to perform the processes as described in FIG. 7. Further, computer system 801 may be used to perform the function of the modules discussed above.

Computer system 801 includes processor 802, which may be a general purpose processor, such as various known commercial CPUs. Processor 802 may interact with input device(s) 804 and output device(s) 805 via I/O interface 803. A user or administrator may interact with computer system 801 using input device(s) 804 such as a keyboard, mouse, card reader, etc. Output device(s) 805, such as a display or printer, may be used to display or print data reports produced from various process steps. Processor 802 may also interact with storage interface 812 to perform part or all of the disclosed method steps. Storage interface 812 may access to memory 815, which may include volatile or non-volatile memory capable of storing instructions, as well as any data necessary to facilitate the disclosed method steps. For example, memory 815 may encompass RAM 813 or ROM 814. Memory 815 may store data such as an operating system 816, user interface 817, and user/application data 821.

Processor 802 may also interact with communication network 808 via network interface 807 to contact remote device(s) 809, 810, and/or 811. Computer system 801 may also communicate with database 822 to gather remote or share data to perform any or all of the disclosed method steps. Computer system 801 may further communicate wirelessly with cellular network, GPS satellites, etc. via transceiver 806.

The specification has described systems and methods for process modeling. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method, implemented by a computer, for process modeling, the method comprising:
    storing a user interface framework in a memory allocated to a browser application in the computer, the user interface framework providing a user interface to a user to operating the computer to perform process modeling;
    rendering the user interface using a rendering engine associated with the browser application;
    capturing, by the computer, one or more process modeling events received as input from the user on the user interface associated with the browser application, the one or more process modeling events associated with one or more process models;
    storing the one or more process modeling events as model data in the memory allocated to the browser application, wherein the memory allocated to the browser application is protected from access by software applications other than the browser application; and
    rendering the one or more process models on the user interface based on at least a subset of the model data, wherein the one or more process models are rendered on the user interface in an offline mode.

2. The method of claim 1, wherein the user interface framework comprises at least one of HTML5, CSS3, JavaScript or Scalable Vector Graphics (SVG) components.

3. The method of claim 1, wherein the one or more process modeling events comprise at least one of: mouse events, user interface events, keyboard events, form events, document events, or window events.

4. The method of claim 1, wherein the model data comprises visual data and process data.

5. The method of claim 4, further comprising rendering a graphical representation of the one or more process models based on the visual data.

6. The method of claim 4, further comprising displaying one or more properties of the one or more process models based on the process data.

7. The method of claim 1, wherein storing at least one of the user interface framework or the model data is independent of configuration of the client device.

8. A computer system for process modeling, the system comprising:
 a processor operatively coupled to a memory device, wherein the processor is configured to execute instructions stored in the memory device to perform operations comprising:
 storing a user interface framework in a memory allocated to a browser application, the user interface framework providing a user interface to a user operating the computer to perform process modeling;
 rendering the user interface using a rendering engine associated with the browser application;
 capturing one or more process modeling events received as input from the user on the user interface associated with the browser application, the one or more process modeling events associated with one or more process models;
 storing the one or more process modeling events as model data in the memory allocated to the browser application, wherein the memory allocated to the browser application is protected from access by software applications other than the browser application; and
 rendering the one or more process models on the user interface based on at least a subset of the model data, wherein the one or more process models are rendered on the user interface in an offline mode.

9. The computer system of claim 8, wherein the user interface framework comprises at least one of HTML5, CSS3, JavaScript or Scalable Vector Graphics (SVG) components.

10. The computer system of claim 8, wherein the one or more process modeling events comprise at least one of: mouse events, user interface events, keyboard events, form events, document events, or window events.

11. The computer system of claim 8, wherein the model data comprises visual data and process data.

12. The computer system of claim 11, further configured to render a graphical representation of the one or more process models based on the visual data.

13. The computer system of claim 11, further configured to display one or more properties of the one or more process models based on the process data.

14. The computer system of claim 8, wherein storing at least one of the user interface framework or the model data is independent of configuration of the computer system.

15. A non-transitory, computer-readable medium storing instructions that, when executed by a processor, cause the processor to perform a method, the method comprising:
 storing a user interface framework in a memory allocated to a browser application in a client device, the user interface framework providing a user interface to a user operating the computer to perform process modeling;
 rendering the user interface using a rendering engine associated with the browser application;
 capturing one or more process modeling events received as input from the user on the user interface associated with the browser application, the one or more process modeling events associated with one or more process models of the process;
 storing the one or more process modeling events as model data in the memory allocated to the browser application, wherein the memory allocated to the browser application is protected from access by software applications other than the browser application; and
 rendering the one or more process models on the user interface based on at least a subset of the model data, wherein the one or more process models are rendered on the user interface in an offline mode.

* * * * *